United States Patent
Gabl

(10) Patent No.: US 8,118,171 B2
(45) Date of Patent: Feb. 21, 2012

(54) PROCESS AND DEVICE FOR AERATING SUSPENSIONS

(75) Inventor: Helmuth Gabl, Graz (AT)

(73) Assignee: Andritz AG, Graz (AT)

( * ) Notice: Subject to any disclaimer, the term of this patent is extended or adjusted under 35 U.S.C. 154(b) by 820 days.

(21) Appl. No.: 12/152,305

(22) Filed: May 14, 2008

(65) Prior Publication Data

US 2008/0296206 A1 Dec. 4, 2008

Related U.S. Application Data

(62) Division of application No. 10/761,866, filed on Jan. 21, 2004, now abandoned.

(30) Foreign Application Priority Data

Jan. 24, 2003 (AT) .................................... A 89/2003

(51) Int. Cl.
*D21C 5/02* (2006.01)
*B03D 1/02* (2006.01)

(52) U.S. Cl. .......................................... 209/164; 162/4

(58) Field of Classification Search .................. 162/4, 5; 209/164

See application file for complete search history.

(56) References Cited

U.S. PATENT DOCUMENTS

| 4,215,447 A | 8/1980 | Gartland et al. ................. 8/156 |
| 5,417,806 A | 5/1995 | Matzke et al. ..................... 162/4 |
| 6,475,337 B2 | 11/2002 | Gabl et al. ......................... 162/4 |
| 7,267,231 B2 | 9/2007 | Gabl ............................ 209/168 |

FOREIGN PATENT DOCUMENTS

| DE | 26 10 581 | | 8/1977 |
| DE | 31 44 561 | | 5/1983 |
| DE | 4206748 A1 | * | 9/1993 |
| DE | 42 38 336 | | 5/1994 |
| GB | 2 030 186 | | 4/1980 |

OTHER PUBLICATIONS

Pfalzer, L., "Deinking of Secondary Fibers; A comparison of washing and flotation". TAPPI Journal, Sep. 1980, vol. 63, No. 9, pp. 113-116.
Pfalzer, L., "The Injector Cell—a Low-energy Flotation Machine", TAPPI Journal, Oct. 1982, vol. 65, No. 10, pp. 73-76.

* cited by examiner

*Primary Examiner* — Thomas M Lithgow
(74) *Attorney, Agent, or Firm* — Alix, Yale & Ristas, LLP

(57) ABSTRACT

The disclosure relates to a process and device for aerating suspensions, particularly to flotate them, for example in deinking of pulp suspensions which includes a primary and secondary stage. In order to improve ash removal, a washing process is interposed between the primary and secondary stages.

9 Claims, 8 Drawing Sheets

PROCESS AND DEVICE FOR AERATING SUSPENSIONS

RELATED APPLICATION

This application is a division of pending U.S. application Ser. No. 10/761,866 filed Jan. 21, 2004 entitled "Process and Device for Aerating Suspensions", the benefit of which is claimed under 35 U.S.C. 120, the disclosure of which is incorporated by reference, and which claims priority under 35 U.S.C. 119 of Austrian Patent application A89/2003 filed Jan. 24, 2003.

BACKGROUND OF THE INVENTION

The invention relates to a process for aerating suspensions, particularly to flotate them, for example in deinking of pulp suspensions, with one or more stages and/or cells, where each stage/cell has its own separate liquid loop. In addition, the invention relates to a device for implementing the process.

A process of this type is known, for example, from EP 1 124 001 A2, where the individual flotation stages can also be designed according to U.S. Pat. No. 4,255,262, EP 0 243 690, DE 31 20 202, or U.S. Pat. No. 6,208,549, for example.

Processes of this type are used to remove impurities and printing ink particles from pulp suspensions, particularly those produced in waste paper treatment. By applying this type of process, non-specific removal of mineral components (e.g., fillers containing ash, etc.) is achieved because their chemical surface properties (particularly loading) are such that they react differently from the ink particles, which are relatively easy to render hydrophobic, in the pulp suspension. In addition, the specific weight of the mineral components is approximately two to three times higher than that of the ink particles. In the processes known, however, some disadvantages occur in selective flotation. If, for example, attempts are made to target the removal of fillers by making certain changes to the process, this always results in a drop in the efficiency of printing ink removal, which leads to a need for additional changes in gas loading, adjustments to the raw material fluctuations, and changes in throughput. Furthermore, if the overflow quantity is increased in order to raise the removal rate of mineral substances, the fibre loss rises in equal proportion to this, which leads to greater expense for disposal and raw materials required.

SUMMARY OF THE INVENTION

The aim of the invention is to reduce or avoid the above disadvantages, while maintaining the same flow path and aeration gas loading.

In the preferred context, the invention may broadly be considered as a process for deinking a pulp suspension by passing the suspension through a series of flotation cells to remove impurities, wherein the improvement comprises diverting at least a portion of the suspension from a cell, washing impurities from the diverted suspension, and returning the washed suspension to a cell.

The invention is thus characterised by a washing process being interposed into the flotation process, where the washing process can be interposed in the liquid loop of one cell, for example a primary or secondary cell, or between the cell stages, i.e., between primary and secondary cells. As a result, it is possible to remove mineral content, particularly ash content, selectively and simply.

In more specific terms, the invention can considered as a process for removing particulate impurities from a feed flow suspension of recoverable solids by passing the feed as an impure fluid flow through a flotation stage, collecting and discharging the flotated impurities through an overflow line, and discharging the purified suspension through an accepts line, wherein each flotation cell has an internal flow loop for processing a portion of the impure fluid flow before discharge from the stage or cell, and wherein the improvement comprises removing some of the impurities by washing at least a portion of the impure fluid flow.

If the solids suspension is diluted to a consistency of some 0.6-1.4%, particularly 0.8-1.3%, before entering the secondary cells, the flotation efficiency can be increased.

If, according to an advantageous further development of the invention, one washing process each is interposed at least into the loop of two cells, ash removal can be further improved substantially.

If the accept flows from at least two washing processes are fed together here to a further washing process (so-called double washing), a further increase can be achieved in the amount of ash removed at reduced fibre loss.

It has proved particularly favourable if the, at least two, washing processes are interposed into the loop of primary cells.

It is advantageous if the accept from the entire process has an ash content of less than approximately 20%, preferably below 15%, at an ingoing filler content of approximately 23% and more. As a result, the accept can be returned to the process again with low fibre loss.

Furthermore, the invention relates to a device for aerating suspensions, particularly to flotate them, for example in deinking of pulp suspensions, with one or more stages and/or cells, where each stage/cell has its own separate liquid loop. According to the invention, this device is characterised by a washer being interposed in the series of flotation cells, where the washer can be interposed into the liquid loop of a cell, for example a primary or secondary cell and/or between the cell stages, i.e., between primary and secondary cells.

Viewed from another perspective, the invention can be considered as an aeration plant having a suspension feed inlet, means for removing particulate impurities from a feed suspension of recoverable solids by passing the feed as an impure fluid flow through at least one impurities flotation stage, means for collecting and discharging the flotated impurities through an overflow line, and means for discharging the purified suspension through an accepts line, wherein the improvement further comprises a washer for removing some of the impurities in at least a portion of the impure fluid flow.

The invention is preferably in the form of an aeration plant having a suspension feed inlet, means for removing particulate impurities from a feed flow suspension of recoverable solids by passing the feed as an impure fluid flow through an impurities flotation stage having a plurality of flotation cells, means for collecting and discharging the flotated impurities through an overflow line, and means for discharging the purified suspension through an accepts line, wherein at least one cell has an internal flow loop for mixing air from an air line with a portion of the impure fluid flow in a liquid line, for aeration injection into the same cell, and wherein the improvement further comprises a washer situated in the internal flow loop, for removing some of the impurities in at least a portion of the impure fluid flow in said loop.

If, according to the invention, at least one washer each is interposed into the loop of two cells, removal of ash filler can be further improved substantially.

If the accept flows from the at least two washers are fed together to a further washer, a further increase can be obtained in ash removal.

A further reduction in the fibre losses while diminishing the volume flows from the flotation washing system can be achieved by post-washing of the reject flows collected.

Furthermore, it has provided advantageous to interpose at least two washers into the primary cells loop.

A favourable configuration results if the washer or washers is/are designed as rotation washers with vertical rotor axis or, alternatively, as roll washers.

BRIEF DESCRIPTION OF THE DRAWINGS

The invention will now be described with reference to the preferred embodiments using the examples in the drawings, where.

DESCRIPTION OF THE PREFERRED EMBODIMENTS

Figure 1:
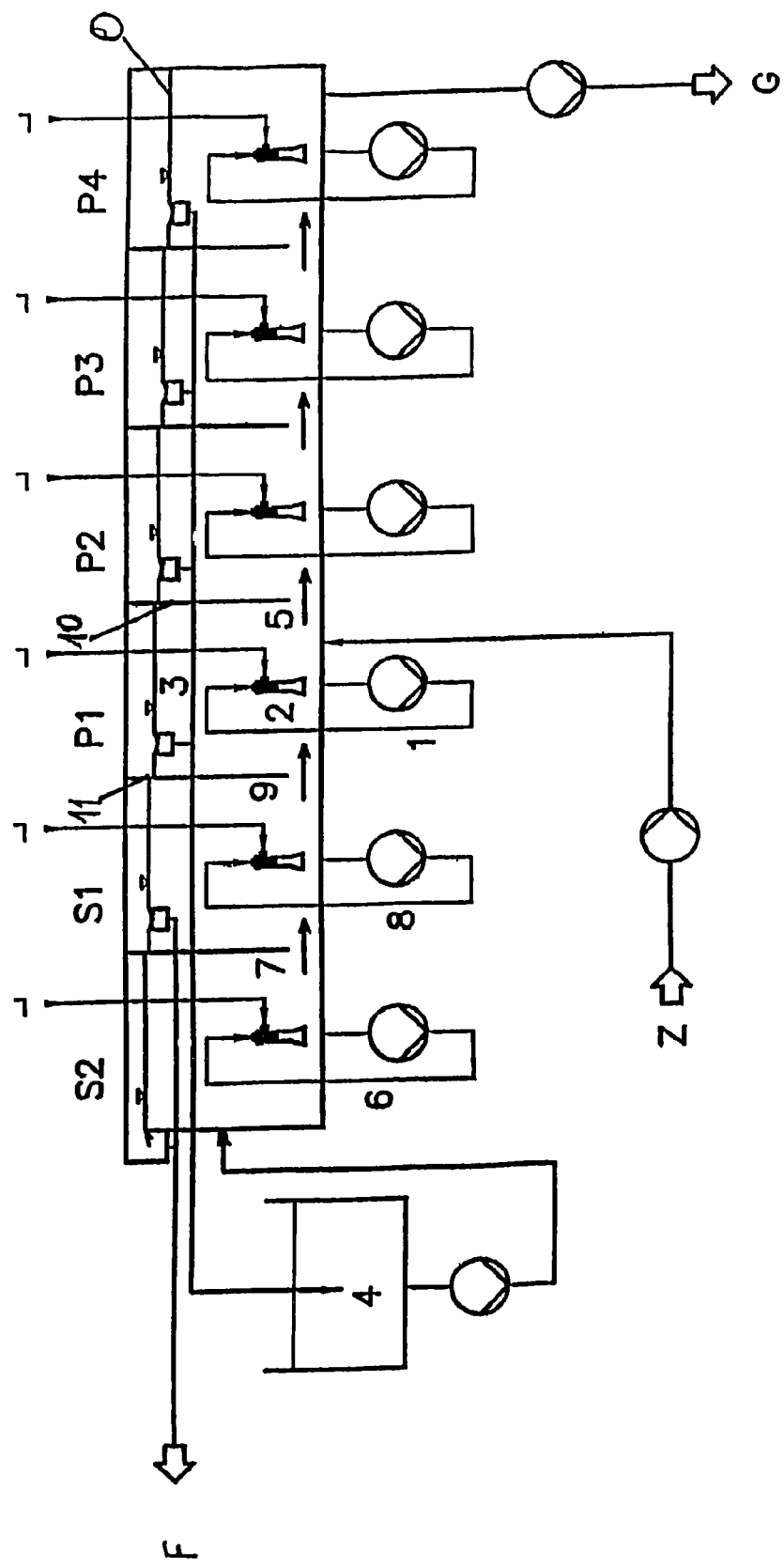
FIG. 1 shows a state-of-the art flotation plant.

FIG. 1 is a schematic diagram of a flotation plant according to the state of the art having a primary stage with four primary cells, P1, P2, P3 and P4, and a secondary stage with two secondary cells, S1 and S2. The flow of pulp suspension Z is brought into the first primary cell P1 at a suitable point. The aeration bubbles are generated inside this cell via internal loop 1, which is disconnected from the feed, by the injector 2 drawing in suspension from the bottom of the cell in a liquid line and air from an air line L and mixing it for injection into the suspension in the same cell. The entire flotation plant is largely filled with suspension, on the surface o of which a foam forms which contains as much as possible of the mineral substances and ink particles to be removed by flotation. The accept flow cleaned in primary cell P1 to remove ink and impurities is transferred to the second primary cell P2 through an opening 5 located at the base of the dividing wall 10. There and in all other primary cells the suspension is treated in the same way, with bubble generating injectors which are operated by internal cell loops, and is discharged at the end of the plant as accept G. The foam collected from all primary cells P1 to P4 can drain off down a foam channel 3 into a tank 4. The overflow from this intermediate tank 4, from which the foam has largely been removed in the meantime, is fed to the secondary cell S2. Gas loading takes place here again round the internal cell loop 6. The accept from the secondary cell S2 to the secondary cell S1 is transferred through the opening 7 located at the base. After gas loading by loop 8, the foam from the secondary cells can be removed as overflow F. The accept from the secondary cell S1 enters the first primary cell P1 through the opening 9 in the dividing wall 11 located at the base.

Figure 2:
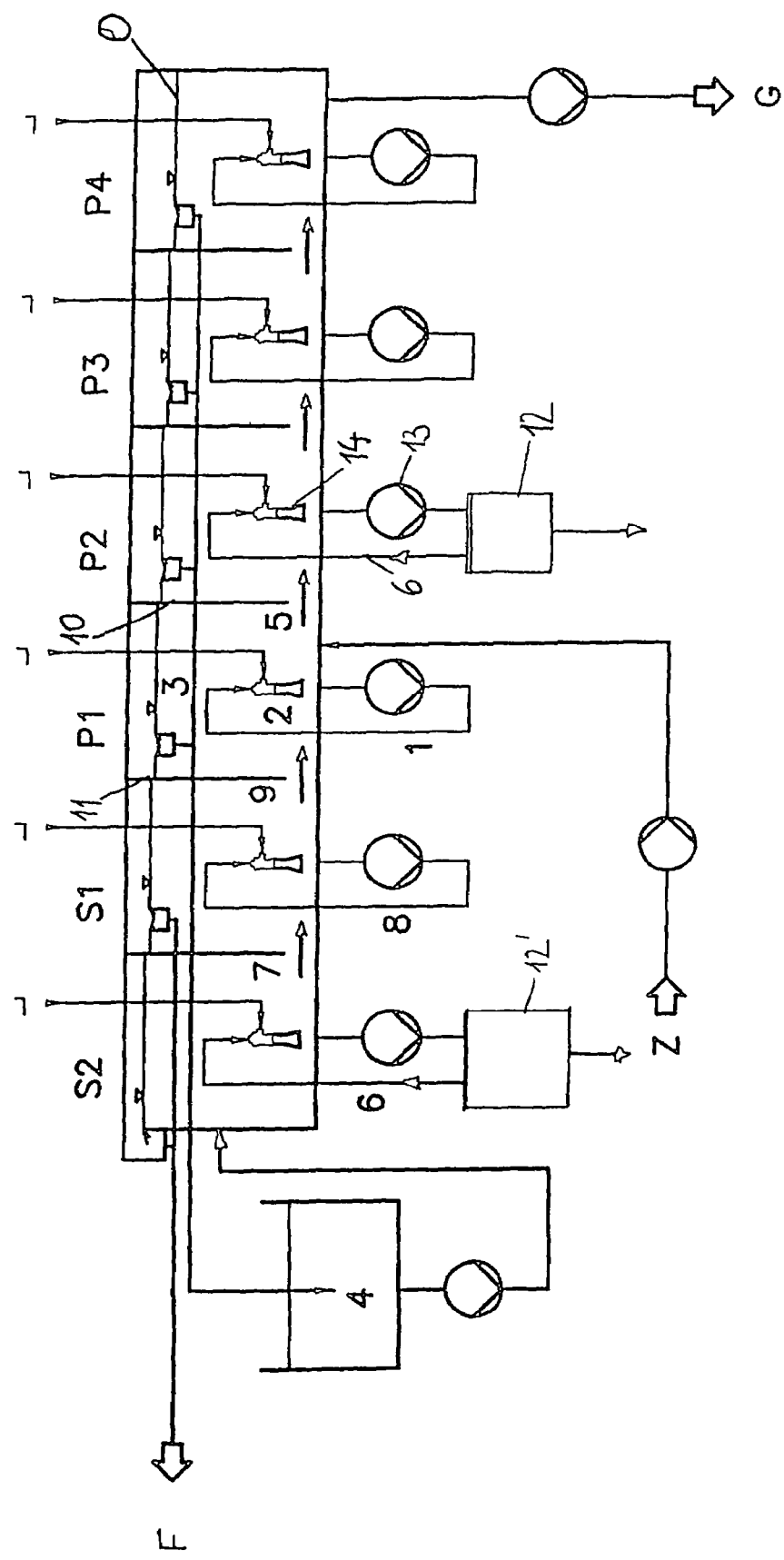
FIG. 2 shows a first variant of the invention.

As a basic principle, the washing stage according to the invention can be interposed at several points. It can be inserted in the internal loop of a primary cell or a secondary cell, or between the primary and secondary stages. FIG. 2 shows the washing stage interposed in a primary stage and a secondary stage. The washer 12 is installed at one of the primary cells (P1, P2, P3, P4), depending on the desired process control and cleanness requirements. As an alternative or in addition, one washer 12' can be interposed in the loop of a secondary cell (S1, S2). As an example, FIG. 2 shows a washer 12 at P2 and a washer 12' at S2. The washer 12, 12' is installed downstream of an injector pump 13. Compared with the state of the art, in the invention the injector pump 13 provides a higher pressure output at the same throughput.

A part flow of the liquid from which the ash is to be removed is drawn off near the base of the cell P2, S2 before the cell content drains into the next cell and enters the same cell after the ash has been removed in the washer 12, 12' and the pulp consistency set by means of the diffuser 14, 14. There is also the possibility of including washing stages between several cell chambers. The fillers (mainly ash) and fines removed in the washer 12, 12' are brought to a sewage treatment plant. The degree of ash removal can be set with the usual machine parameters. By setting the injector flow rate independently of production, according to the state of the art as shown in FIG. 1, it is also possible to coordinate the degree of ash removal in the market pulp.

If, according to the invention, forward feed of the entire production flow is requested or if a washing stage is to be installed in an existing DIP (de-inked pulp) plant, the ash can also be removed from the entire flow between the cells. In order to retain the flotation efficiency, the loop must be opened and the pulp consistency further diluted, preferably to approximately 0.8 to 1.3%.

Figure 3:
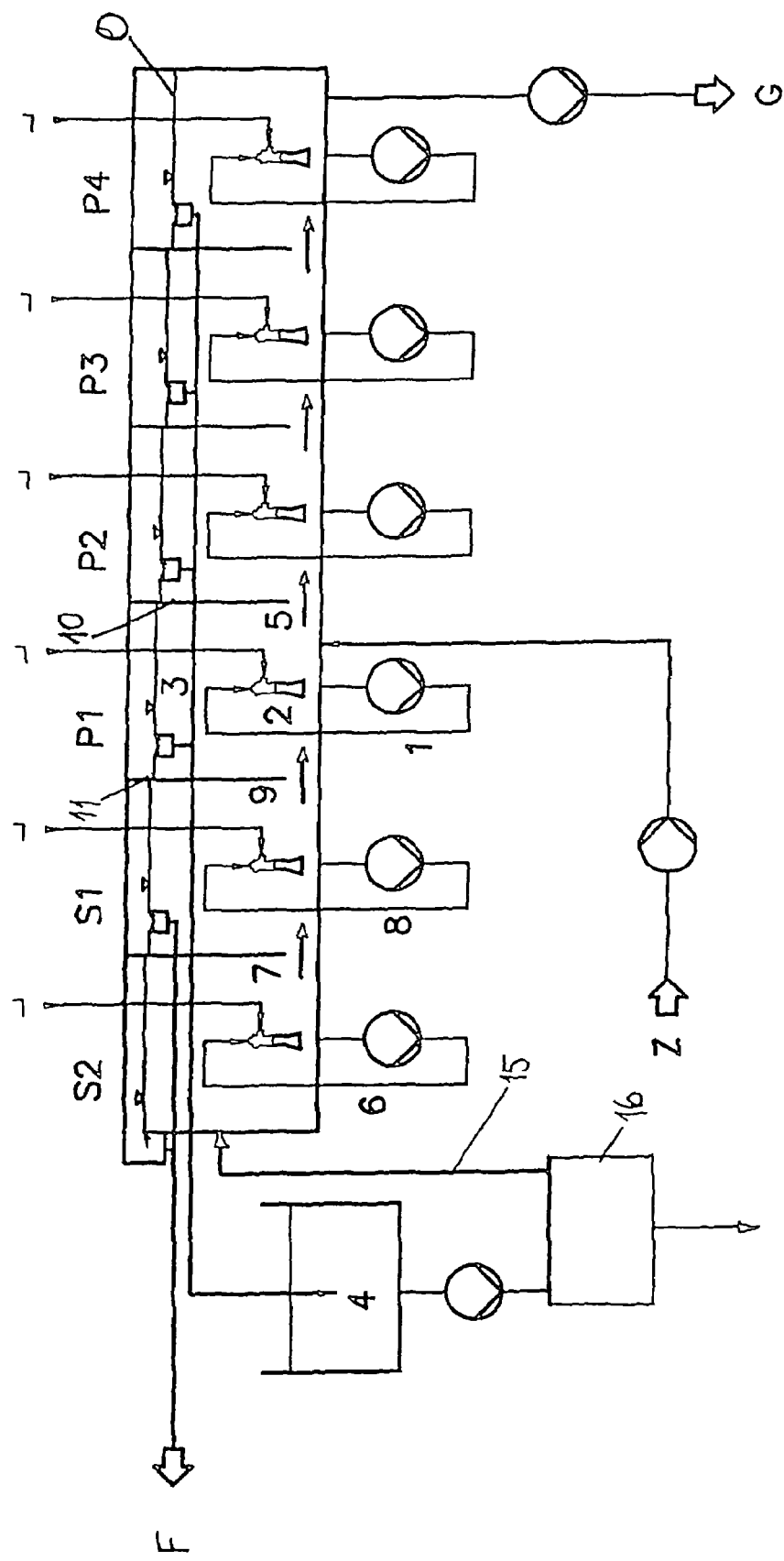
FIG. 3 shows a second variant of the invention.
Figure 7:
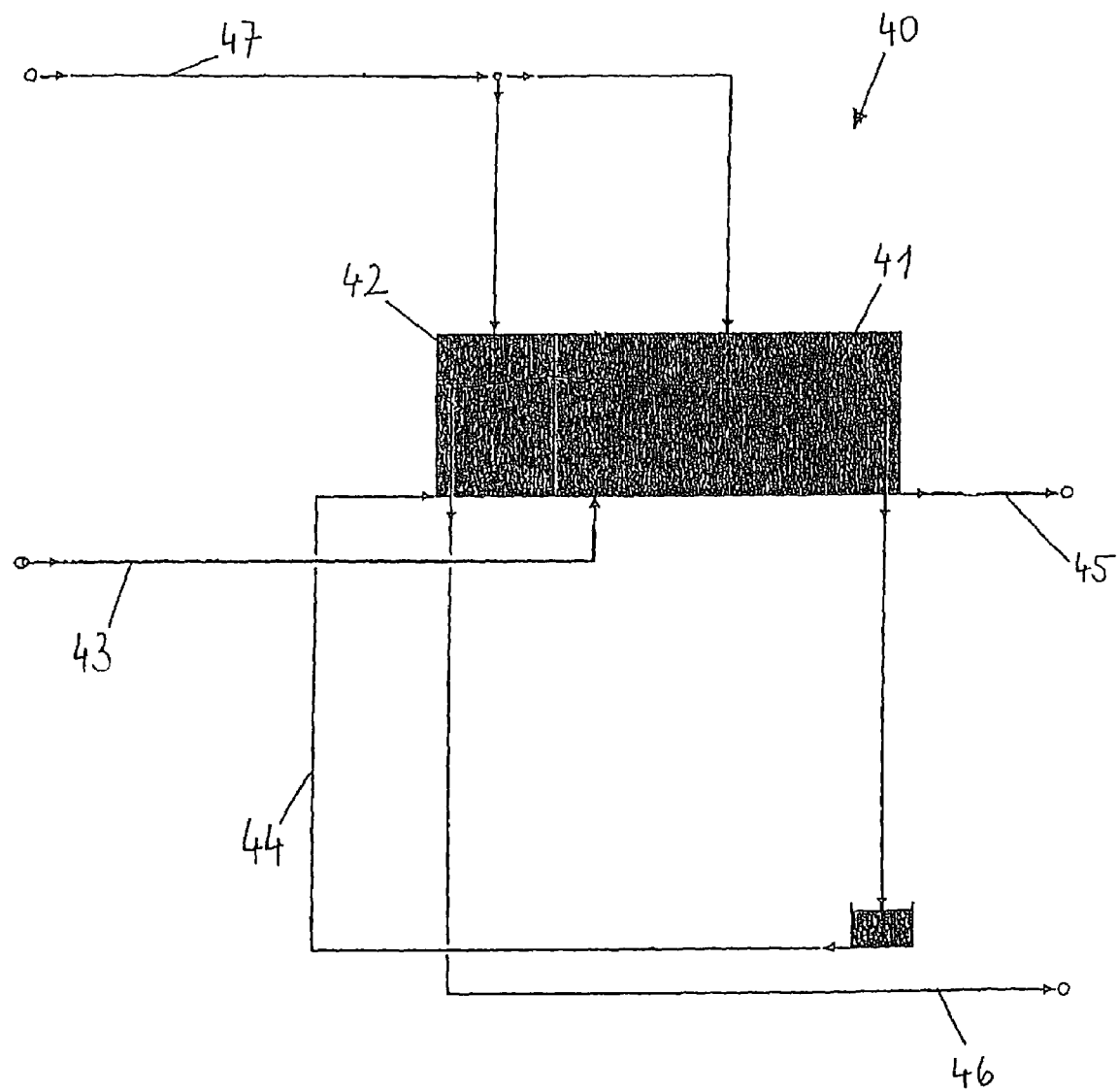
FIG. 7 represents a mass balance according to the state of the art.

In FIG. 3, the feed 15 to the secondary cell is treated in a washer 16, acting as ash removal device, such that the hydraulic load in the secondary cells is reduced due to removal of ash and fines. The fundamental aspect here, however, is targeted removal of ash. The mass balances of this configuration are shown in FIG. 7 for state of the art and in FIG. 8 for the present invention. The variant of FIG. 3 shows the most effective form of partial flow washing because the foam is already enriched considerably with mineral substances during the flotation process.

In the ash removal process the accept is thickened. In order to ensure that the pulp consistency is not too high in secondary flotation, the pulp suspension is normally diluted to approximately 0.6 to 1.4%. This process is needed in all ash removal procedures within the flotation stage.

Figure 4:
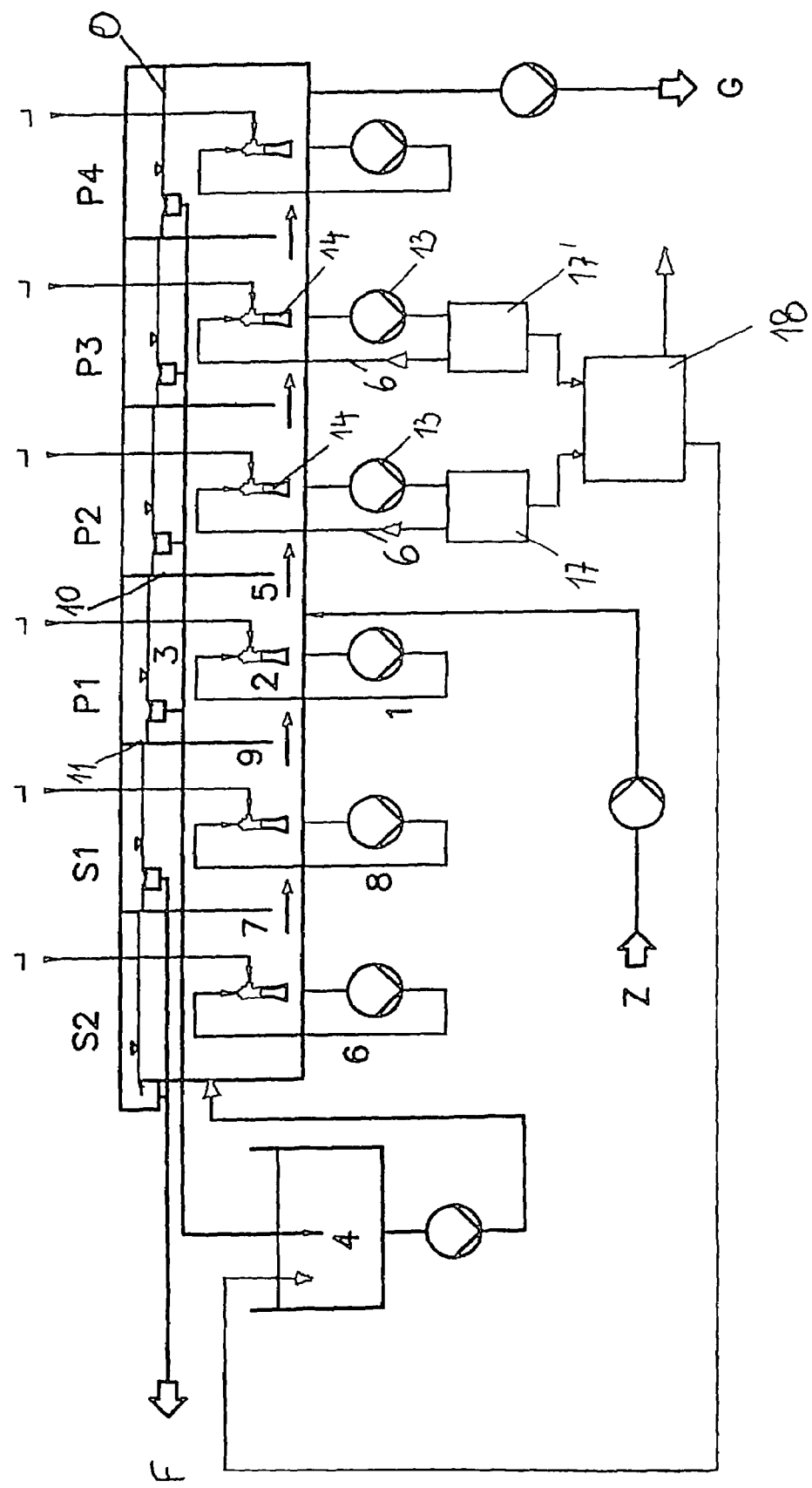
FIG. 4 shows a particularly favourable third variant of the invention.

A further potential means of removing the ash is shown in FIG. 4. Here, the ash is removed in two partial flows. In order to further reduce the fibre losses, the ash removal units 17,17' are cascaded. The accept, now depleted of filler and coming from the next washer 18, is brought to the flotation foam tank 4 and undergoes further flotation together with the overflow foam from the primary cells to the secondary cells. The reject, which contains a high concentration of fillers and fines, is disposed of in a DAF (Dissolved Air Flotation) unit or a sludge press.

Figure 5:
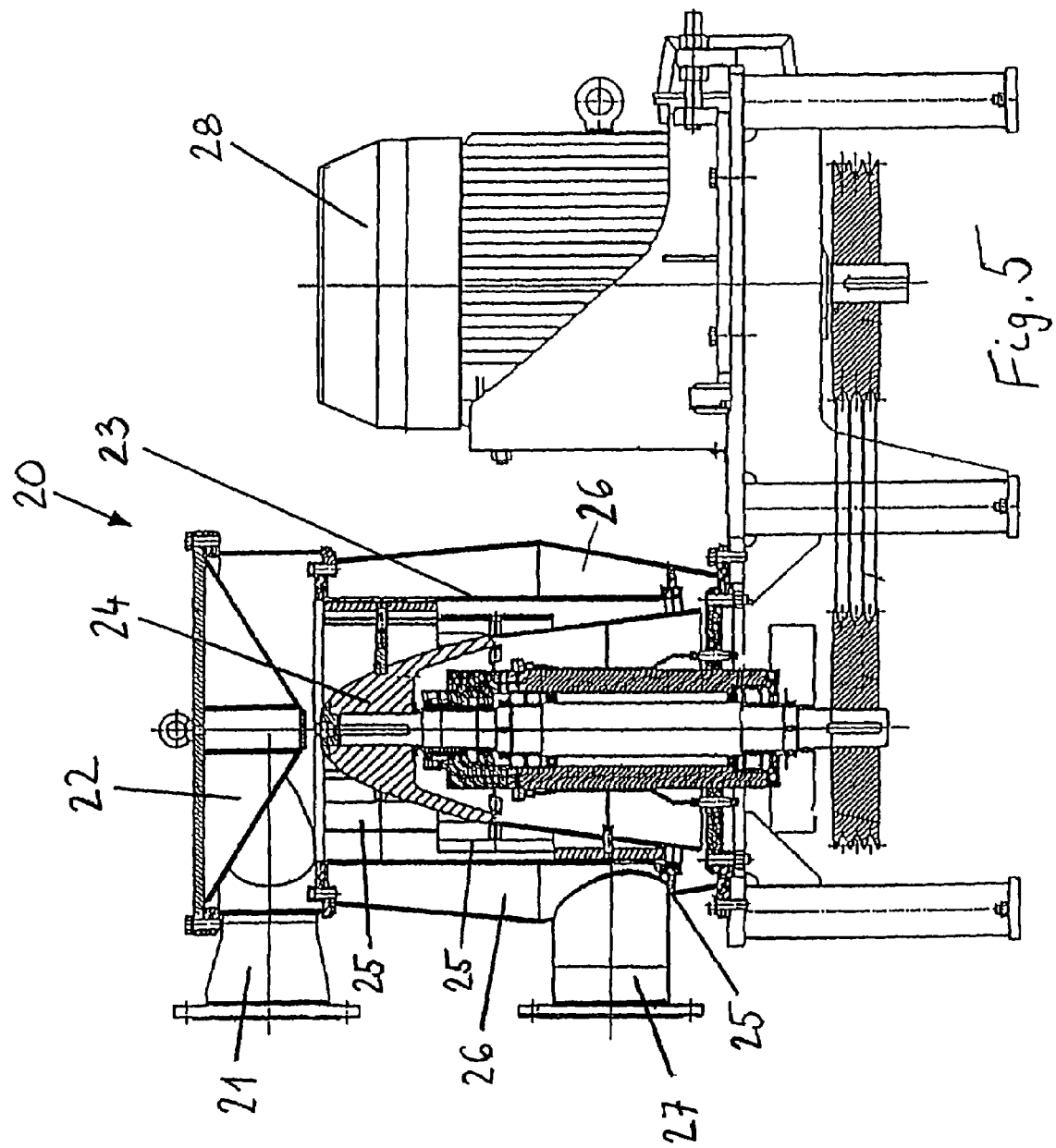
FIG. 5 shows a first variant of a washer for implementing the invention.

FIG. 5 shows a potential variant of an ash removal device in the form of a rotation washer 20. The suspension is fed to the top of washer 20 through the feed branch 21. A stationary fitting 22 deflects the suspension flow downward with favourable flow characteristics to the inner part of the cylindrical screen basket 23. In this area there is a rotor 24, which has an upstream parabolic shape and downstream foils 25 extending radially outward toward basket 23. The accept passing through the screen 23 is collected in an accept area 26 and discharged through the accept outlet 27. The rotor 24 is driven by drive 28. This type of unit has low energy consumption, achieved by the favourable flow path, particularly the parabolic rotor. A high level of ash removal can be obtained by optimising screens and foil designs.

Figure 6:
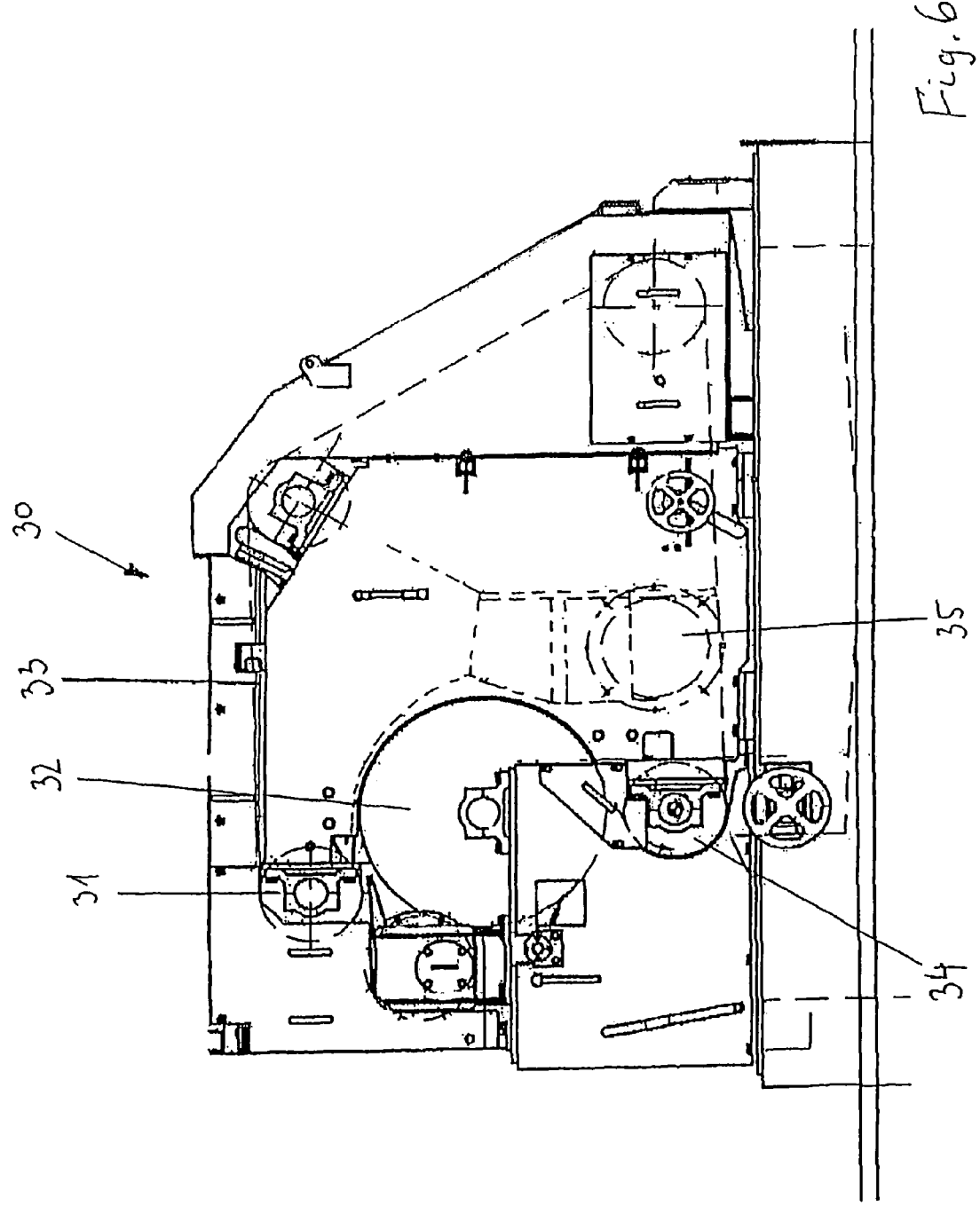
FIG. 6 shows a second variant of a washer for implementing the invention.

FIG. 6 shows an alternative configuration of a washer as a roll washer 30. The suspension is fed through a so-called headbox 31, through which the suspension is injected between the roll 32 and a screen 33. The screen 33 is driven by a drive roll 34 and the filtrate, which is the accept, exits through the filtrate discharge 35.

FIG. 7 shows the pulp flows in a state-of-the-art flotation plant 40. The flotation plant shown here comprises primary cells 41 and secondary cells 42. The suspension feed 43 is fed to the primary cells 41, from where the overflow 44 is brought to the secondary cells 42. The accept 45 is carried away from the primary cells 41, while the overflow 46 with the concentrated solids is taken from the secondary cells 42. At some points in the system more shower water 47 is added. The values for the individual pulp flows are shown in the following Table 1.

TABLE 1

| Flow | No. | Volume flow, total [l/min] | Solids content [%] | rel. ash content in solids [%] |
|---|---|---|---|---|
| Feed | 43 | 15000 | 1.2 | 25.0 |
| Return flow | 44 | 3200 | 1.07 | 66.0 |
| Flow rate/accept | 45 | 15500 | 1.07 | 21.2 |
| Discharge/overflow | 46 | 550 | 2.55 | 70.0 |
| Shower water | 47 | 1050 | — | — |

Figure 8:
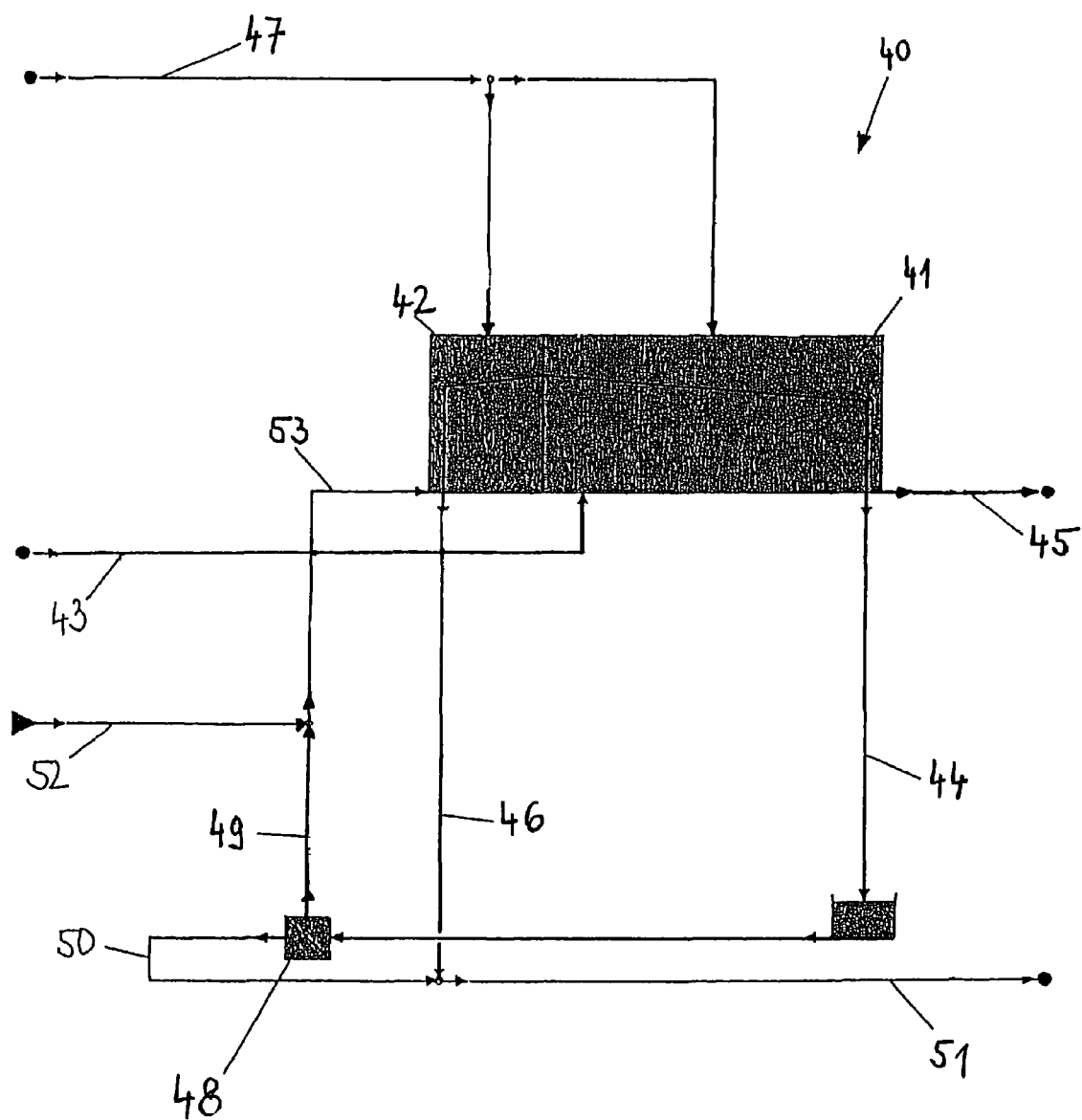
FIG. 8 represents a mass balance according to the variant of the invention shown in FIG. 3.

FIG. 8 shows the pulp flows from a flotation plant 40 according to FIG. 3, with primary cells 41 and secondary cells 42. The suspension feed 43 is fed to the primary cells 41, from where the overflow 44, is brought to the ash removal device, specifically to the washer 48. The "accept" 49 from the washer 48 is reduced to a consistency of less than 1% by adding dilution water 52 and fed to the secondary cells 42 at 53. The flow with a high filler load 50 coming from the washer is mixed with the overflow 46 from the secondary cells 42 and discharged from the system as total overflow 51. The values of the individual pulp flows can be found in the following Table 2. For present purposes, the flow in 43, 41, 44, 53, and 42 can be defined as an impure fluid flow, and thus the invention includes locating the washing device 48 and associated wash return 49 not only in the secondary return line 53, but at any location in the impure fluid flow, e.g., 41, 44, 53, and/or 42.

TABLE 2

| Flow | No. | Volume flow total [l/min] | Solid content [%] | rel. ash content in solids [%] |
|---|---|---|---|---|
| Feed P1 | 43 | 15000 | 1.2 | 25.0 |
| Foam discharge from primary cells | 44 | 2550 | 1.11 | 64.8 |
| Flow rate/accept | 45 | 14480 | 1.11 | 17.2 |
| Overflow from secondary cells | 46 | 30 | 2.3 | 72.7 |
| Shower water | 47 | 1100 | — | — |
| Return flow after washer 48 | 49 | 240 | 3.9 | 14.7 |
| Discharge after washer 48 | 50 | 2300 | 0.8 | 89.5 |
| Total overflow | 51 | 2330 | 0.8 | 88.9 |
| Dilution water | 52 | 720 | — | — |
| Return flow to secondary cells | 53 | 960 | 0.97 | 14.7 |

In a comparison of Tables 1 and 2 it becomes clear that the process according to the invention provides accept with a higher solids content and a lower relative ash content, with the same solids and ash input. Thus, almost twice as much ash is discharged compared to the state-of-the-art process.

If the plant is also equipped with further washers for part flows, e.g. according to FIG. 2 or 4, even better ash removal rates can be obtained.

Removal of a large percentage of the filler from the production flow has a further positive effect, namely additional removal of small ink particles which are difficult to remove by flotation. As a result, the brightness or whiteness is also increased.

The invention claimed is:

1. A process in an aeration plant comprising a suspension feed inlet, and at least one primary flotation stage and at least one secondary flotation stage, for removing particulate impurities from a feed flow suspension of recoverable solids by passing the feed as an impure fluid flow through said flotation stages, collecting and discharging the flotated impurities through an overflow line, and discharging the purified suspension through an accepts line, wherein the improvement comprises
feeding the suspension to at least one primary cell where a primary cell overflow is passed to said overflow line,
collecting and removing impurities from the overflow line, to produce a washed flow having reduced impurities,
feeding the washed flow to at least one secondary cell where impurities are separated from a secondary accepts flow, and
passing the secondary accepts flow to a primary cell.

2. The process according to claim 1 wherein
the feed is a pulp suspension and the impurities include ash,
ash is collected and removed from the overflow line,
the secondary stage receives flow only from the washed flow, and
all the accept from the secondary stage is fed to the primary stage.

3. The process according to claim 2, further comprising diluting the solids suspension to a consistency of about 0.6-1.4% before it enters the secondary stage.

4. The process according to claim 2, wherein the accept from the entire process has an ash content of less than approximately 20%, preferably below 15%, at an inlet feed filler content of at least about 23%.

5. The process according to claim 1 wherein each of the flotation stages include at least one cell with an internal flow loop, said internal flow loop mixing air with a portion of said impure fluid flow for aeration injection into said cell.

6. The process according to claim 1 wherein the plant has a plurality of primary flotation cells and at least one secondary flotation cell.

7. The process according to claim 6, wherein the washing is also associated with at least one primary cell.

8. The process according to claim 7, wherein the washing is also associated with at least one secondary cell.

9. The process according to claim 8 wherein the washing associated with said primary and secondary cell is preformed by a washer positioned in the internal flow loop before recycling the impure fluid back to the same flotation cell.

* * * * *